(12) United States Patent
Kim (10) Patent No.: US 11,831,390 B2
(45) Date of Patent: Nov. 28, 2023

(54) SYSTEM FOR CONTROLLING UNMANNED AERIAL VEHICLE AND METHOD THEREOF

(71) Applicants: Hyundai Motor Company, Seoul (KR); Kia Motors Corporation, Seoul (KR)

(72) Inventor: Hyun Soo Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 282 days.

(21) Appl. No.: 17/210,739

(22) Filed: Mar. 24, 2021

(65) Prior Publication Data

US 2022/0085870 A1    Mar. 17, 2022

(30) Foreign Application Priority Data

Sep. 16, 2020  (KR) .................. 10-2020-0119044

(51) Int. Cl.
  *H04B 7/185*    (2006.01)
  *B64C 39/02*    (2023.01)
  *B64U 101/20*    (2023.01)
  *B64U 101/30*    (2023.01)

(52) U.S. Cl.
  CPC ....... *H04B 7/18504* (2013.01); *B64C 39/024* (2013.01); *H04B 7/18506* (2013.01); *B64U 2101/20* (2023.01); *B64U 2101/30* (2023.01); *B64U 2201/10* (2023.01)

(58) Field of Classification Search
  CPC ............ H04B 7/18504; H04B 7/18506; B64C 39/024; B64U 2201/10; B64U 2101/30; B64U 2101/20
  See application file for complete search history.

(56) References Cited

U.S. PATENT DOCUMENTS

| | | | |
|---|---|---|---|
| 2012/0158237 A1* | 6/2012 | Lee .................. | G05D 1/0274 701/26 |
| 2014/0070991 A1* | 3/2014 | Liu ................... | G01S 19/428 342/357.63 |
| 2015/0215798 A1* | 7/2015 | Choi ................. | H04W 24/08 455/424 |
| 2018/0268720 A1* | 9/2018 | Sharma ............. | G05D 1/101 |
| 2019/0182730 A1* | 6/2019 | Yeh .................. | H04L 43/062 |
| 2019/0278302 A1* | 9/2019 | Sundaresan ....... | G01S 19/10 |
| 2019/0281479 A1* | 9/2019 | Althoff ............. | G05D 1/0094 |
| 2019/0312633 A1* | 10/2019 | Nilsson ............. | H04W 16/18 |
| 2020/0178198 A1* | 6/2020 | Ding ................. | H04W 60/04 |
| 2022/0369205 A1* | 11/2022 | Vivanco ............ | H04W 48/04 |

FOREIGN PATENT DOCUMENTS

KR    10-1670769 B1    10/2016
KR    10-1853288 B1    5/2018

* cited by examiner

*Primary Examiner* — Bailor C Hsu
(74) *Attorney, Agent, or Firm* — MORGAN, LEWIS & BOCKIUS LLP (57) ABSTRACT

A system for controlling an unmanned aerial vehicle may control to receive a departure point and a destination from a vehicle, and transmit information related to a shadow area between the departure point and the destination to the unmanned aerial vehicle to control the unmanned aerial vehicle to measure a communication sensitivity for each altitude in the shadow area.

21 Claims, 7 Drawing Sheets

SYSTEM FOR CONTROLLING UNMANNED AERIAL VEHICLE AND METHOD THEREOF

CROSS-REFERENCE TO RELATED APPLICATION

The present application claims priority to Korean Patent Application No. 10-2020-0119044, filed on Sep. 16, 2020, the entire contents of which is incorporated herein for all purposes by this reference.

BACKGROUND OF THE PRESENT INVENTION

Field of the Invention

The present invention relates to a system for controlling an unmanned aerial vehicle and a method thereof, and more particularly, to a system for controlling an unmanned aerial capable of providing a smooth communication environment in a shadow area within a driving path of a vehicle, and a method thereof.

Description of Related Art

Advanced driver assistance systems (ADAS) have been developed to automate, adapt, and improve vehicle systems for safety and better driving.

Safety functions are designed to prevent collisions and accidents by providing technologies that warn a driver of potential problems, implement a protection device, or prevent a collision through control of a vehicle.

Adaptive functions may provide automate lighting, provide adaptive cruise control, automate braking, integrate GPS/traffic warnings, connect to smart phones, and warn drivers of other vehicles or dangerous objects, keep a driver in a correct lane, or show what is in a blind spot.

However, it is difficult to recognize and avoid a dangerous situation such as a pedestrian suddenly appearing in a blind spot while a vehicle is driving in the above manner, and expensive vehicle-mounted equipment and road facilities are required so that there is difficulty in commercialization in general.

Accordingly, there is a need to develop a vehicle driving system configured for recognizing and avoiding various dangerous situations even without expensive equipment while a vehicle is driving.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for controlling an unmanned aerial vehicle configured for providing a smooth communication environment between a control center, an unmanned aerial vehicle and a vehicle when there is a shadow area in the driving path when a vehicle travels on a path, and a method thereof.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a system for controlling an unmanned aerial vehicle includes a telematics server that receives a departure point and a destination from a vehicle, transmits information related to a shadow area between the departure point and the destination to the unmanned aerial vehicle to control the unmanned aerial vehicle to measure a communication sensitivity for each altitude in the shadow area, determines an optimal altitude path having a relatively high communication sensitivity in the shadow area based on the communication sensitivity for each altitude in the shadow area measured through the unmanned aerial vehicle, and controls the unmanned aerial vehicle to assist a communication function of the vehicle while flying along the optimal altitude path when the vehicle passes through the shadow area.

According to various aspects of the present invention, there is provided a system for controlling an unmanned aerial vehicle, wherein the unmanned aerial vehicle receives information related to a shadow area based on a departure point and a destination of a vehicle from a telematics server to measure a communication sensitivity for each altitude in the shadow area, receives an optimal altitude path having a relative high communication sensitivity in the shadow area from the telematics server after transmitting the communication sensitivity for each altitude in the shadow area to the telematics server, and assists a communication function of the vehicle while flying along the optimal altitude path when the vehicle passes through the shadow area.

The telematics server may select an outermost point on one side of the shadow area as a shadow start point, select an outermost point of an opposite side of the shadow area as a shadow end point, controls the unmanned aerial vehicle to measure a communication sensitivity through communication with a wireless communication base station around the shadow area while the unmanned aerial vehicle flies from the shadow start point to the shadow end point, and determines the optimal altitude path by receiving the communication sensitivity measured through the unmanned aerial vehicle.

The telematics server may select a plurality of altitudes from the shadow start point to the shadow end point to control the unmanned aerial vehicle to normally measure the communication sensitivity for each altitude while the unmanned aerial vehicle flies when a time in which the vehicle arrives at the shadow area is later than a time in which the unmanned aerial vehicle completes the measurement of the communication sensitivity, and select a number of altitudes from the shadow start point to the shadow end point, which is less than a predetermined number of normal measurements, to control the unmanned aerial vehicle to measure the communication sensitivity for each altitude by the number of altitudes selected while the unmanned aerial vehicle flies when the time when the vehicle arrives at the shadow area is earlier than the time when the unmanned aerial vehicle completes the measurement of the communication sensitivity.

The unmanned aerial vehicle may include a communication device that performs communication between the telematics server and the vehicle, a sensor that measures communication sensitivity by communicating with a wireless communication base station around the shadow area, and a flight controller that is configured to control flight in the shadow area.

The unmanned aerial vehicle may identify a minimum altitude, a maximum altitude, and an intermediate altitude which is an intermediate height between the minimum altitude and the maximum altitude while reciprocating along a driving path of the vehicle from the shading start point to the shading end point, and measure the communication sensitivity while making a one-way flight at the minimum altitude, the intermediate altitude, or the maximum altitude along the driving path.

The unmanned aerial vehicle may perform as a wireless repeater between the vehicle and the wireless communication base station while flying at the minimum altitude, the intermediate altitude or the maximum altitude based on a driving distance of the vehicle from the shadow start point to the shadow end point when the vehicle arrives in the shadow area.

According to yet another aspect of the present invention, a method of controlling an unmanned aerial vehicle includes receiving a departure point and a destination from a vehicle, transmitting information related to a shadow area between the departure point and the destination to the unmanned aerial vehicle to control the unmanned aerial vehicle to measure a communication sensitivity for each altitude in the shadow area, determining an optimal altitude path having a relatively high communication sensitivity in the shadow area based on the communication sensitivity for each altitude in the shadow area measured through the unmanned aerial vehicle, and controlling the unmanned aerial vehicle to assist a communication function of the vehicle while the unmanned aerial vehicle flies along the optimal altitude path when the vehicle passes through the shadow area.

According to yet another aspect of the present invention, a method of controlling an unmanned aerial vehicle includes receiving information related to a shadow area based on a departure point and a destination of a vehicle from a telematics server to measure a communication sensitivity for each altitude in the shadow area, receiving an optimal altitude path having a relative high communication sensitivity in the shadow area from the telematics server after transmitting the communication sensitivity for each altitude in the shadow area to the telematics server, and assisting a communication function of the vehicle while flying along the optimal altitude path when the vehicle passes through the shadow area.

The method may further include selecting, by the telematics server, an outermost point on one side of the shadow area as a shadow start point, and selecting an outermost point of an opposite side of the shadow area as a shadow end point, controlling, by the telematics server, the unmanned aerial vehicle to measure the communication sensitivity through communication with a wireless communication base station around the shadow area while the unmanned aerial vehicle flies from the shadow start point to the shadow end point, and determining, by the telematics server, the optimal altitude path by receiving the communication sensitivity measured through the unmanned aerial vehicle.

The method may further include comparing, by the telematics server, a time in which the unmanned aerial vehicle completes the measurement of the communication sensitivity with a time when the vehicle arrives in the shadow area, selecting, by the telematics server, a plurality of altitudes from the shadow start point to the shadow end point to control the unmanned aerial vehicle to normally measure the communication sensitivity for each altitude while the unmanned aerial vehicle flies when the time when the vehicle arrives at the shadow area is later than the time when the unmanned aerial vehicle completes the measurement of the communication sensitivity, and selecting, by the telematics server, a number of altitudes from the shadow start point to the shadow end point, which is less than a predetermined number of normal measurements, to control the unmanned aerial vehicle to measure the communication sensitivity for each altitude by the number of altitudes selected while the unmanned aerial vehicle flies when the time when the vehicle arrives at the shadow area is earlier than the time when the unmanned aerial vehicle completes measuring the communication sensitivity.

The method may further include identifying, by the unmanned aerial vehicle, a minimum altitude, a maximum altitude, and an intermediate altitude which is an intermediate height between the minimum altitude and the maximum altitude while reciprocating along a driving path of the vehicle from the shading start point to the shading end point, and measuring, by the unmanned aerial vehicle, the communication sensitivity while making a one-way flight at the minimum altitude, the intermediate altitude, or the maximum altitude along the driving path.

The method may further include performing, by the unmanned aerial vehicle, as a wireless repeater between the vehicle and the wireless communication base station while flying at the minimum altitude, the intermediate altitude or the maximum altitude based on a driving distance of the vehicle from the shadow start point to the shadow end point when the vehicle arrives in the shadow area.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1, FIG. 2, FIG. 3, FIG. 4, and FIG. 5.

Figure 1:
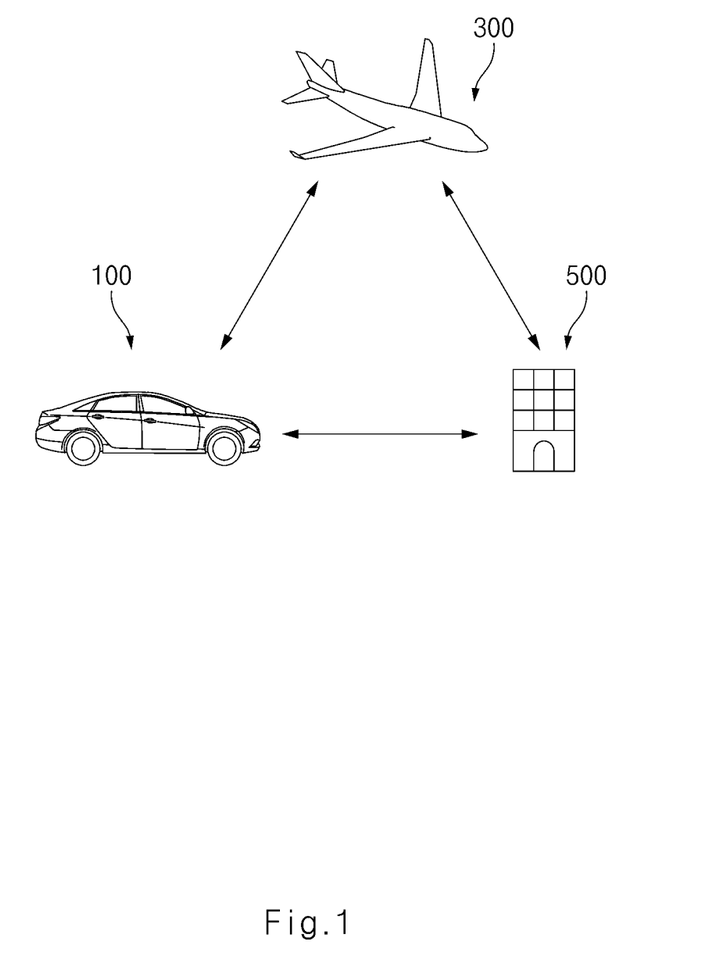
FIG. 1 and FIG. 2 are exemplary views exemplarily illustrating a system for controlling an unmanned aerial vehicle according to various exemplary embodiments of the present invention.
Figure 2:
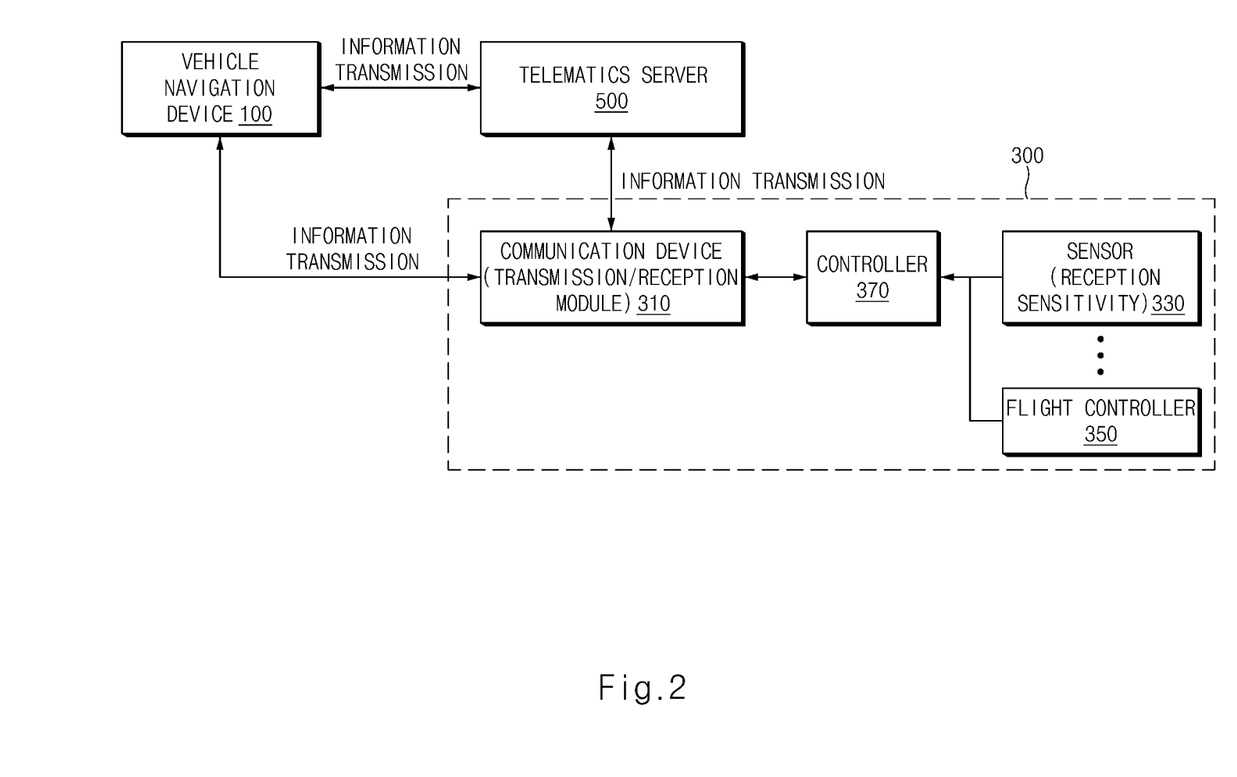
Figure 3:
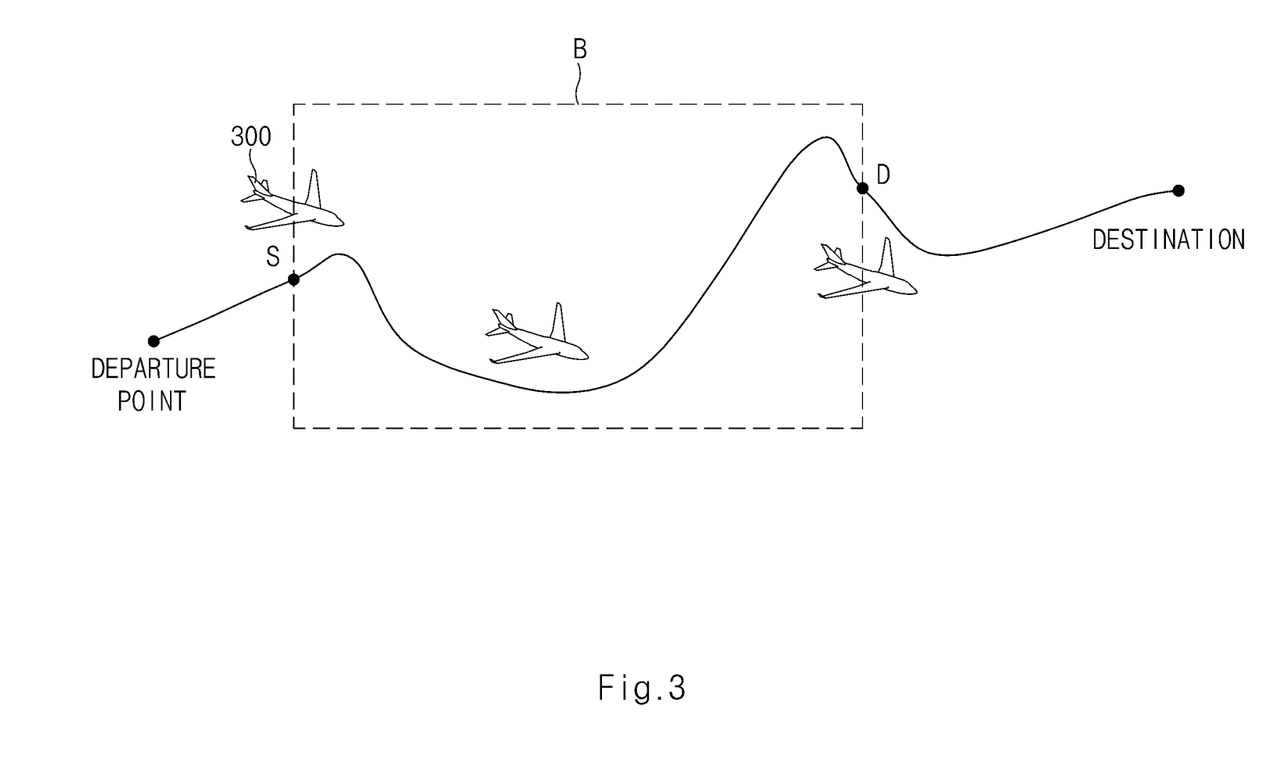
FIG. 3, FIG. 4, and FIG. 5 are views exemplarily illustrating a process of measuring a shadow area through an unmanned aerial vehicle forming a system for controlling an unmanned aerial vehicle according to various exemplary embodiments of the present invention.
Figure 4:
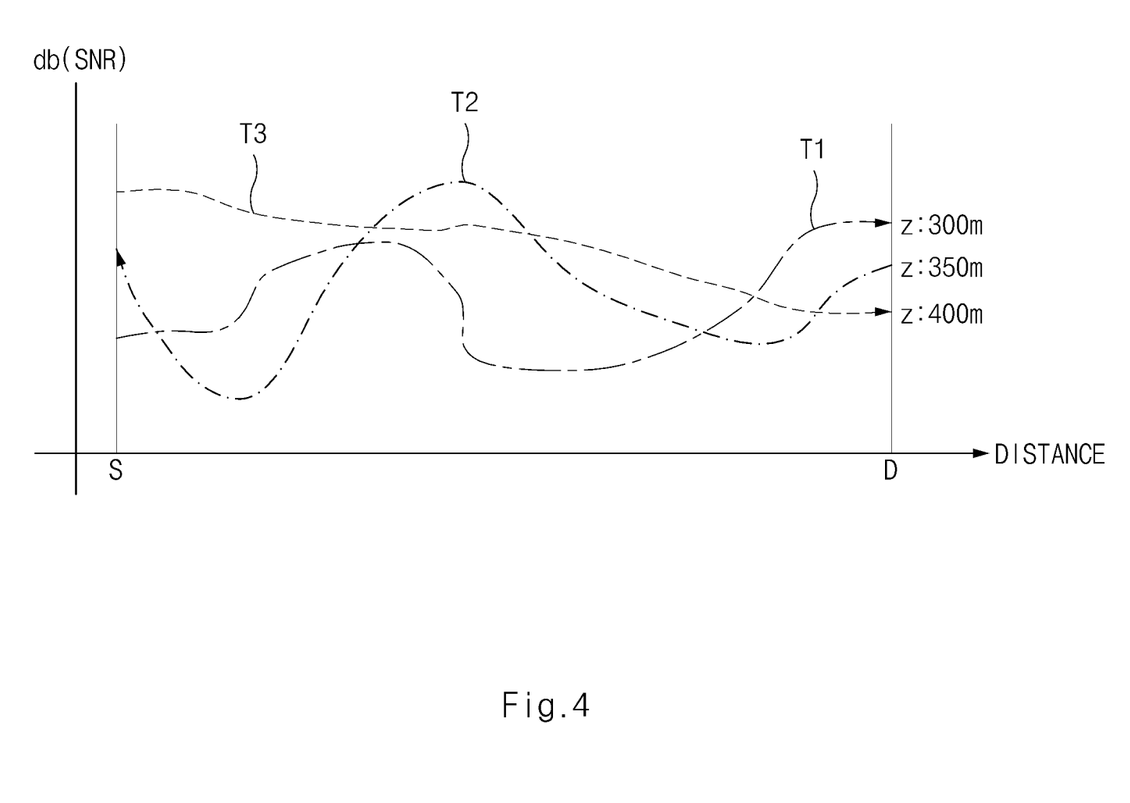
Figure 5:
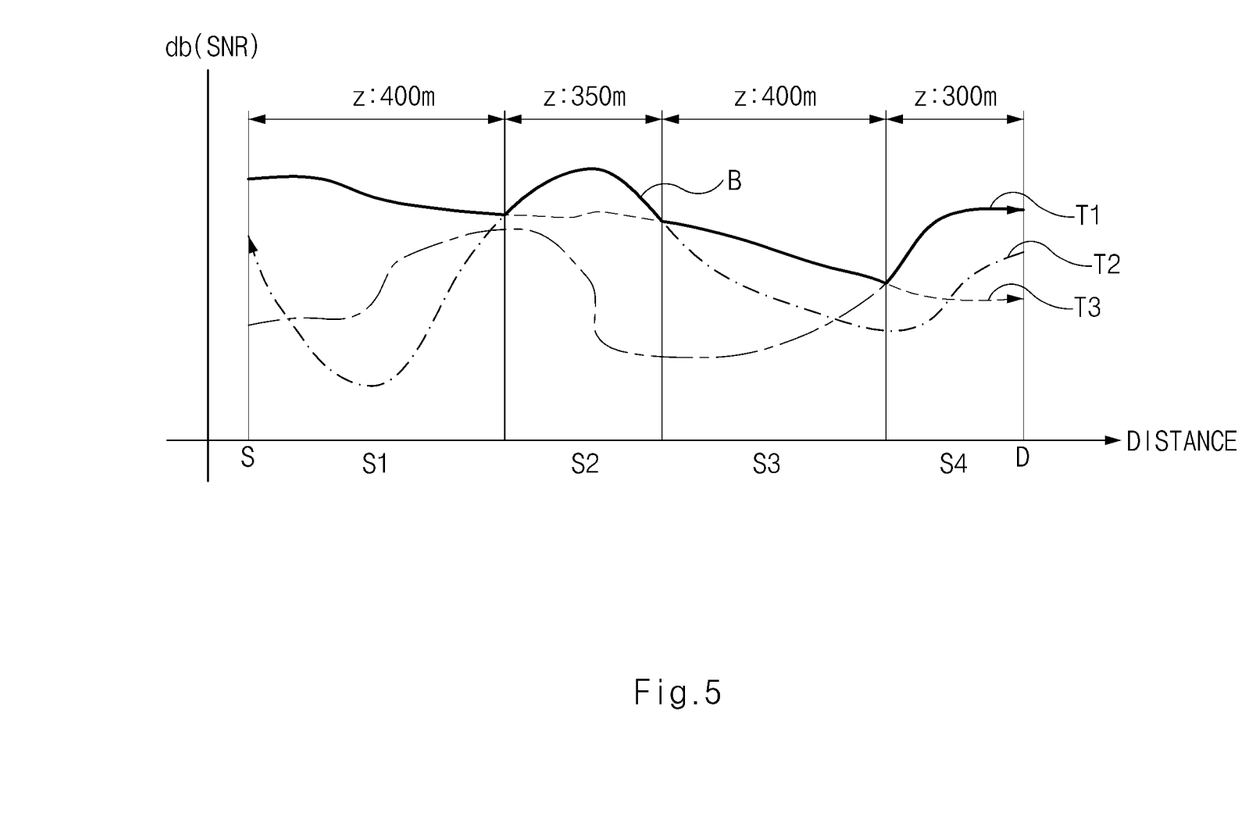

FIG. 1 and FIG. 2 are exemplary views exemplarily illustrating a system for controlling an unmanned aerial vehicle according to various exemplary embodiments of the present invention. FIG. 3, FIG. 4, and FIG. 5 are views exemplarily illustrating a process of measuring a shadow area through an unmanned aerial vehicle forming a system for controlling an unmanned aerial vehicle according to various exemplary embodiments of the present invention.

Referring to FIG. 1, a system for controlling an unmanned aerial vehicle according to various exemplary embodiments of the present invention may include a vehicle 100, an unmanned aerial vehicle (UAV) 300, and a telematics server 500.

The vehicle 100 may include a navigation device, a sensor, and a communication device.

A driver of the vehicle 100 may input destination information through the navigation device, obtain status information related to the vehicle 100, surrounding situation information related to the vehicle 100, and the like through the sensor, and transmit departure information, the destination information, the status information, the surrounding situation information, and the like through the communication device to the unmanned aerial vehicle 300 and the telematics server 500.

When receiving the departure information, destination information, status information, surrounding situation information, and the like from the vehicle 100, the telematics server 500 may generate path information between a departure point and a destination of the vehicle 100 based on map information stored in a separate database, and may determine a shadow area "B" on the path.

The path information may include information such as tunnels, overpasses, underpasses, obstacles, uphill roads, downhill roads, entrances and exits of connecting roads, curvature of a road, and the like that exist between the departure point and the destination, distance information, and the like.

The information related to a shadow area "B" may include a section, such as a multipath section, a fading section, and the like within the path, in which transmission/reception sensitivity of communication is relatively low.

The telematics server 500 may transmit the path information and the shadow area "B" information between the departure point and the destination to the vehicle 100 and the unmanned aerial vehicle 300, respectively, and may provide a control command for allowing the unmanned aerial vehicle 300 to measure a communication sensitivity for each altitude in the shadow area "B" while flying in the shadow area "B", to the unmanned aerial vehicle 300.

The unmanned aerial vehicle 300 may include a communication device 310, a sensor 330, a flight controller 350, and a controller 370.

The communication device 310, which is configured for performing communication between the telematics server 500 and the vehicle 100, may receive a current location, and the like from the vehicle 100, and receive the departure point and the destination of the vehicle 100, the path information, the shadow area "B" information, and the like from the telematics server 500.

The sensor 330 may measure a communication sensitivity for each altitude in the shadow area "B" through communication with a wireless communication base station around the shadow area "B" on a path between the departure point and the destination of the vehicle 100.

The flight controller 350 may control various devices that allow the unmanned aerial vehicle 300 to fly corresponding to a control command provided from the telematics server 500.

The controller 370 may receive flight path information from the telematics server 500, control flight through the flight controller 350, and control to measure the communication sensitivity through the sensor 330.

The unmanned aerial vehicle 300 may be a multicopter such as a dualcopter, a tricopter, a quadcopter, an octocopter, and the like configured for performing vertical takeoff and landing and flight including a rotorcraft. The unmanned aerial vehicle 300 is not limited to the above-described rotorcraft and may include various unmanned flight devices.

Referring to FIG. 3, the telematics server 500 may select one outermost point in the shadow area "B" as a shadow start point "S", and select an opposite outermost point in the shadow area "B" as a shadow end point "D".

The shadow start point "S" may be a point close to the departure point of the vehicle 100, and the shadow end point "D" may be a point close to the destination of the vehicle 100.

The telematics server 500 may determine a time required for the unmanned aerial vehicle 300 to measure the communication sensitivity in the shadow area "B", based on the path distance from the shadow start point "S" to the shadow end point "D", the maximum speed of the unmanned aerial vehicle 300, and the altitude.

The telematics server 500 may control the unmanned aerial vehicle 300 to perform normal measurement when the estimated arrival time when the vehicle 100 departs from the departure point and arrives at the shadow area "B" is later than the estimated completion time when the measurement of the communication sensitivity of the shadow area "B" is completed, that is, it is expected to be able to complete the measurement of the communication sensitivity of the shadow area "B" through the unmanned aerial vehicle 300 before the vehicle 100 arrives at the shadow area "B".

Referring to FIG. 4, in the normal measurement, the unmanned aerial vehicle 300 may collect information related to a flight path, such as the minimum flyable altitude, the maximum flyable altitude, and the like, while flying back and forth from the shadow start point S to the shadow end point "D" along the driving path of the vehicle 100 in advance.

After collecting the information related to the flight path in the shadow area "B", the unmanned aerial vehicle 300 may measure a communication sensitivity such as a signal-to-noise ratio (SNR) based on a nearby wireless communication base station and a line of sight (LOS), while flying back and forth along the driving path of the vehicle 100 from the shadow start point "S" to the shadow end point "D" by changing the altitude value from the minimum altitude to the maximum altitude.

For example, when the minimum altitude is 300 meters, and the maximum altitude is 400 meters, the unmanned aerial vehicle 300 may measure a primary communication sensitivity T1 while flying one-way at an altitude of 300 meters from the shadow start point "S" toward the shadow end point "D", measure a secondary communication sensitivity T2 while flying one-way from the shadow end point "D" to the shadow start point "S" at an altitude of 350 meters, which is an intermediate altitude, and measure the third communication sensitivity T3 while flying one-way at an altitude of 400 meters from the shadow start point "S" toward the shadow end point "D".

The unmanned aerial vehicle 300 may transmit the communication sensitivity information measured in the shadow area "B" to the telematics server 500, and the telematics server 500 may determine the optimal altitude path "T" in the shadow area "B" based on the communication sensitivity information received from the unmanned aerial vehicle 300.

The optimal altitude path "T" may represent a flight altitude having a relatively high communication sensitivity according to a distance in a driving path of the vehicle 100 between the shadow start point "S" and the shadow end point "D".

For example, referring to FIG. 5, it may be understood that the communication sensitivity is relatively high at a height of 400 meters in a first section S1, the communication sensitivity is relatively high at a height of 350 meters in a second section S2, the communication sensitivity is relatively high at a height of 400 meters in a third section S3, and the communication sensitivity is relatively high at a height of 300 meters in a fourth section S4.

The telematics server 500 may transmit the determined optimal altitude path "T" to the unmanned aerial vehicle 300.

The unmanned aerial vehicle 300 may receive the optimal altitude path "T" from the telematics server 500. When the vehicle 100 arrives in the shadow area "B", the unmanned aerial vehicle 300 may perform the function of a wireless repeater between the vehicle 100 and the wireless communication base station while moving from the shadow start point "S" to the shadow end point "D" together with the vehicle 100 and flying along the optimal altitude path "T" based on the driving distance of the vehicle 100.

That is, when the vehicle 100 travels in the first section S1, the unmanned aerial vehicle 300 may perform the function of a wireless repeater while flying at a height of 400 meters. When the vehicle 100 travels in the second section S2, the unmanned aerial vehicle 300 may performs the function of a wireless repeater while flying at a height of 350 meters. When the vehicle 100 travels in the third section S3, the unmanned aerial vehicle 300 may performs the function of a wireless repeater while flying at a height of 400 meters. When the vehicle 100 travels in the fourth section S4, the unmanned aerial vehicle 300 may performs the function of a wireless repeater while flying at a height of 300 meters.

Meanwhile, the telematics server 500 may control the unmanned aerial vehicle 300 to perform shortened measurement when the estimated arrival time when the vehicle 100 departs from the departure point and arrives at the shadow area "B" is earlier than the estimated completion time when the measurement of the communication sensitivity of the shadow area "B" is completed, that is, it is expected that the vehicle 100 arrives in the shadow area "B" before the measurement of the communication sensitivity of the shadow area "B" through the unmanned aerial vehicle 300 is completed.

In the shortened measurement, the number of measurements may be selected to be less than the number of normal altitude measurements from the shadow start point "S" to the shadow end point "D" such that the measurement completion time is shortened by allowing the unmanned aerial vehicle 300 to measure communication sensitivity while flying for each altitude.

For example, in the normal measurement, when the communication sensitivity is measured while flying at each of the minimum altitude, intermediate altitude and maximum altitude, in the shortened measurement, one or two altitudes may be selected from the minimum altitude, the intermediate altitude, or the maximum altitude to measure the communication sensitivity while flying, shortening the measurement completion time. Accordingly, it is possible to complete the measurement of the communication sensitivity in the shadow area "B" before the vehicle 100 arrives at the shadow area "B".

Hereinafter, a method of controlling an unmanned aerial vehicle according to various exemplary embodiments of the present invention will be described in detail with reference to FIG. 6 and FIG. 7.

Figure 6:
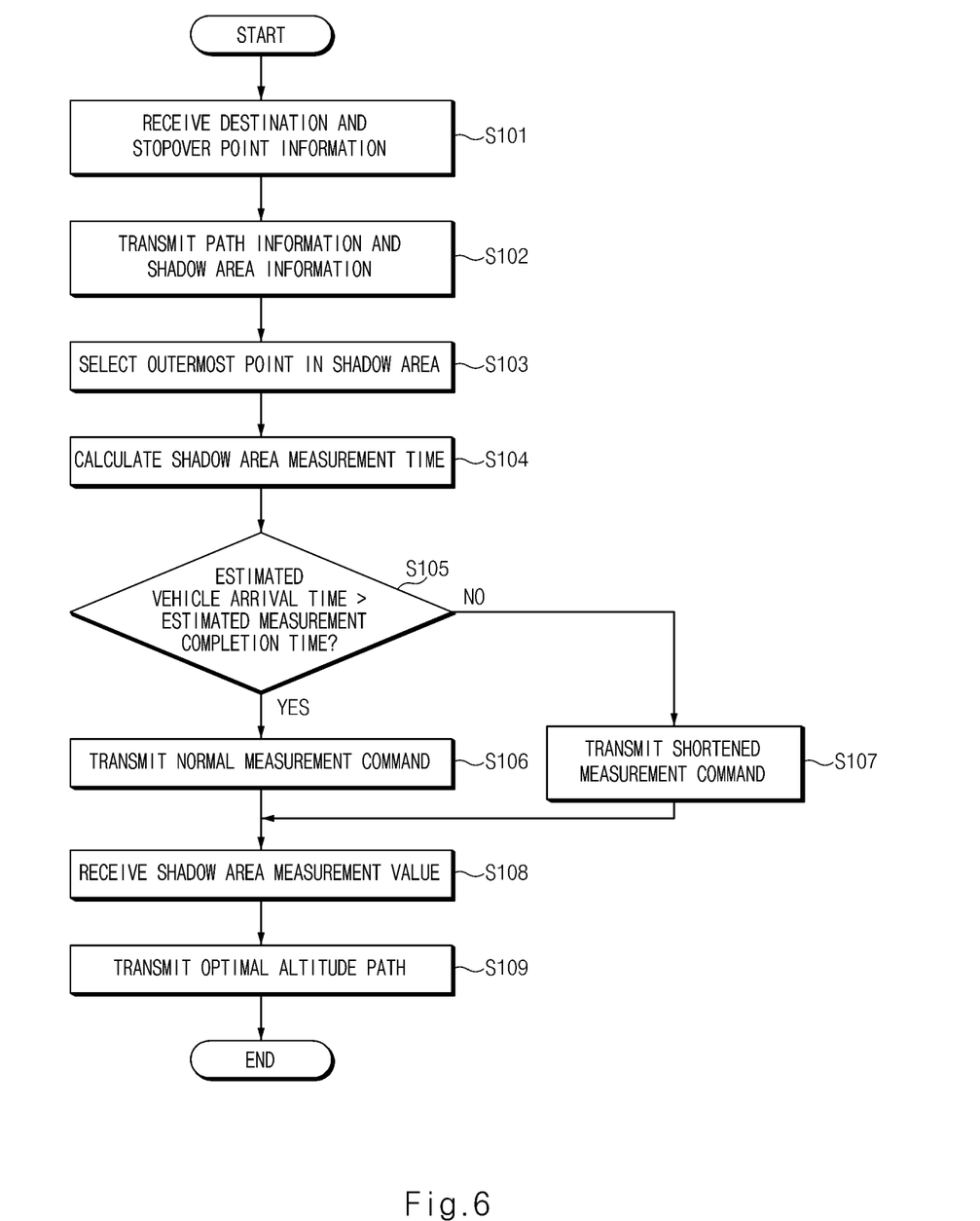
FIG. 6 is a flowchart illustrating a method of controlling an unmanned aerial vehicle according to various exemplary embodiments of the present invention, when the telematics server receives a departure point, a stopover point, and a destination from the vehicle.
Figure 7:
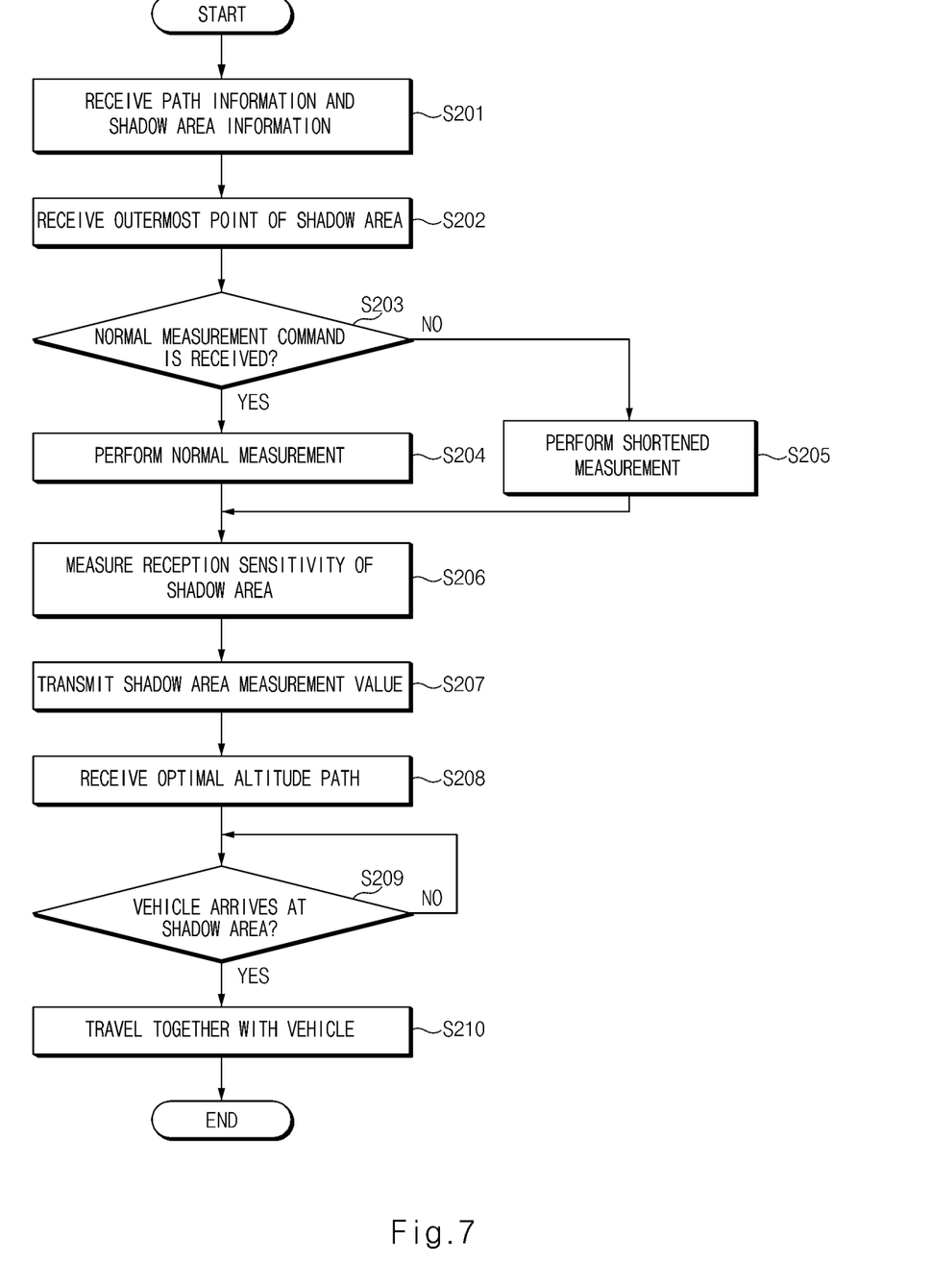
FIG. 7 is a flowchart illustrating a method of controlling an unmanned aerial vehicle according to various exemplary embodiments of the present invention, when the unmanned aerial vehicle receives the path information and the shadow area information based on the departure point and destination of the vehicle from the telematics server.

FIG. 6 and FIG. 7 are flowcharts illustrating a method of controlling an unmanned aerial vehicle according to various exemplary embodiments of the present invention.

Hereinafter, it is assumed that the system for controlling an unmanned aerial vehicle of FIG. 1 performs the processes of FIG. 6 and FIG. 7.

First, in S101, the telematics server 500 may receive a departure point, a stopover point, and a destination from the vehicle 100.

Accordingly, the telematics server 500 may transmit the path information and the shadow area "B" information between the departure point and the destination to the unmanned aerial vehicle 300 in S102. In S103, the telematics server 500 may select an outermost point on one side of the shadow area "B" as a shadow start point "S" and select an outermost point on an opposite side of the shadow area "B" as a shadow end point "D".

Accordingly, in S104, the unmanned aerial vehicle 300 may determine a time required to complete the measurement of the communication sensitivity in the shadow area "B".

Accordingly, in S105, the estimated completion time when the unmanned aerial vehicle 300 completes the measurement of the communication sensitivity may be compared with the estimated arrival time when the vehicle 100 arrives at the shadow area "B". In S106, when the estimated arrival time when the vehicle 100 arrives at the shadow area "B" is later than the estimated completion time when the unmanned aerial vehicle 300 completes the measurement of the communication sensitivity, a plurality of altitudes may be selected from the shadow start point "S" to the shadow end point "D", and the unmanned aerial vehicle is controlled to normally measure the communication sensitivity while flying for each altitude.

The unmanned aerial vehicle 300 receives the path information and the shadow area "B" information based on the departure point and destination of the vehicle 100 from the telematics server 500 in S201, and receive the shadow start point "S" and the shadow end point "D" in S202.

The unmanned aerial vehicle 300 may receive a control command to normally measure the communication sensitivity by communicating with the wireless communication base station around the shadow area "B" while flying from the shadow start point "S" to the shadow end point "D" in S203, may normally measure the communication sensitivity for each altitude in the shadow area "B" in S204, S206, and may transmit a value measured in the shadow area 'B' to the telematics server 500 in S207.

Accordingly, in S109, the telematics server 500 may determine the optimal altitude path "T", in which the communication sensitivity is relatively high in the shadow area "B", based on the communication sensitivity for each altitude in the shadow area "B", which is transmitted through the unmanned aerial vehicle 300 in S108.

The unmanned aerial vehicle 300 may receive the optimal altitude path "T" from the telematics server 500 in S208. When the vehicle 100 passes through the shadow area "B" in S209, in S210, the unmanned aerial vehicle 300 may assist the communication function of the vehicle 100 while flying along the optimal altitude path "T".

Meanwhile, when the estimated arrival time when the vehicle 100 arrives at the shadow area "B" is earlier than the estimated completion time when the unmanned aerial vehicle 300 completes the measurement of the communication sensitivity in S105, the number of altitudes may be selected from the shadow start point "S" to the shadow end point "D" to be less than the number of normal measurements in S107 and in S205, the unmanned aerial vehicle 300 may be controlled to measure the communication sensitivity for each altitude by the number of altitudes selected while flying for each altitude, performing the shortened measurement.

As described above, according to various exemplary embodiments of the present invention, when there is a shadow area in a driving path along which the vehicle travels, it is possible to provide a smooth communication environment between the control center, the unmanned aerial vehicle, and the vehicle. Furthermore, without a separate navigation device configured for an unmanned aerial vehicle, the unmanned aerial vehicle may be operated automatically, and the area in which the communication of a vehicle is impossible due to the shadow area may be covered through the unmanned aerial vehicle.

Furthermore, because it may be easy to secure a line of sight (LOS) with a nearby wireless communication base station by use of an unmanned aerial vehicle flight environment (over 300 m above the ground), there are few communication interferences and obstacles in the vicinity, and an unmanned aerial vehicle may fly while maintaining a specified distance from a vehicle in the air, it is possible to provide an environment which is more favorable for wireless communication than the surrounding infrastructure.

The present technology may provide a smooth communication environment between a control center, an unmanned aerial vehicle, and a vehicle when there is a shadow area in a driving path along which a vehicle travels.

Furthermore, various effects that are directly or indirectly understood through the present invention may be provided.

The above description is a simple exemplification of the technical spirit of the present invention, and the present invention may be variously corrected and modified by those skilled in the art to which various exemplary embodiments of the present invention pertains without departing from the essential features of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling an unmanned aerial vehicle, the system comprising: a telematics server configured to:
   receive a departure point and a destination from a vehicle;
   transmit information related to a shadow area between the departure point and the destination to the unmanned aerial vehicle to control the unmanned aerial vehicle to measure a communication sensitivity for a plurality of altitudes in the shadow area;
   determine an optimal altitude path based on the communication sensitivity for each of the altitudes in the shadow area measured through the unmanned aerial vehicle; and
   control the unmanned aerial vehicle to assist a communication function of the vehicle while flying along the optimal altitude path upon determining that the vehicle passes through the shadow area, and
   wherein the telematics server is further configured to:
      select the plurality of altitudes in the shadow area;
      measure the communication sensitivity for each altitude; and
      determine a path connecting altitudes with a highest measured communication sensitivity in an arbitrary section as the optimal altitude path, and wherein the shadow area is an area in which communication sensitivity is less than a predetermined threshold.

2. The system of claim 1, wherein the telematics server is further configured to:
   select an outermost point on one side of the shadow area as a shadow start point;
   select an outermost point of an opposite side of the shadow area as a shadow end point;
   control the unmanned aerial vehicle to measure the communication sensitivity through communication with a wireless communication base station around the shadow area while the unmanned aerial vehicle flies from the shadow start point to the shadow end point; and
   determine the optimal altitude path by receiving the communication sensitivity measured through the unmanned aerial vehicle.

3. The system of claim 2, wherein the telematics server is further configured to:
   select the plurality of altitudes from the shadow start point to the shadow end point to control the unmanned aerial vehicle to normally measure the communication sensitivity for each altitude while the unmanned aerial vehicle flies when a time in which the vehicle arrives at the shadow area is later than a time in which the unmanned aerial vehicle completes the measurement of the communication sensitivity; and
   select a number of altitudes from the shadow start point to the shadow end point, which is less than a predetermined number of normal measurements, to control the unmanned aerial vehicle to measure the communication sensitivity for each altitude by the number of altitudes selected while the unmanned aerial vehicle flies when the time the vehicle arrives at the shadow area is earlier than the time in which the unmanned aerial vehicle completes the measurement of the communication sensitivity.

4. The system of claim 3, wherein the unmanned aerial vehicle is configured to:
   identify a minimum altitude, a maximum altitude, and an intermediate altitude which is an intermediate height between the minimum altitude and the maximum altitude while reciprocating along a driving path of the vehicle from the shadow start point to the shadow end point; and
   measure the communication sensitivity while making a one-way flight at the minimum altitude, the intermediate altitude, or the maximum altitude along the driving path.

5. The system of claim 4, wherein the unmanned aerial vehicle is further configured to:
   perform as a wireless repeater between the vehicle and the wireless communication base station while flying at the minimum altitude, the intermediate altitude or the maximum altitude based on a driving distance of the vehicle from the shadow start point to the shadow end point upon determining that the vehicle arrives in the shadow area.

6. A system for controlling an unmanned aerial vehicle, wherein the unmanned aerial vehicle is configured to:
   receive information related to a shadow area based on a departure point and a destination of a vehicle from a telematics server to measure a communication sensitivity for each altitude a plurality of altitudes in the shadow area;
   receive an optimal altitude path from the telematics server after transmitting the communication sensitivity for each of the altitudes in the shadow area to the telematics server; and
   assist a communication function of the vehicle while flying along the optimal altitude path upon determining that the vehicle passes through the shadow area,
   wherein the telematics server is further configured to:
      select the plurality of altitudes in the shadow area;
      measure the communication sensitivity for each altitude; and
      determine a path connecting altitudes with a highest measured communication sensitivity in an arbitrary section as the optimal altitude path, and
   wherein the shadow area is an area in which communication sensitivity is less than a predetermined threshold.

7. The system of claim 6, wherein the telematics server is configured to:
   select an outermost point on one side of the shadow area as a shadow start point;
   select an outermost point of an opposite side of the shadow area as a shadow end point;
   control the unmanned aerial vehicle to measure the communication sensitivity through communication with a wireless communication base station around the shadow area while the unmanned aerial vehicle flies from the shadow start point to the shadow end point; and
   determine the optimal altitude path by receiving the communication sensitivity measured through the unmanned aerial vehicle.

8. The system of claim 7, wherein the telematics server is further configured to:
   select the plurality of altitudes from the shadow start point to the shadow end point to control the unmanned aerial vehicle to normally measure the communication sensitivity for each altitude while the unmanned aerial vehicle flies when a time in which the vehicle arrives at the shadow area is later than a time in which the unmanned aerial vehicle completes the measurement of the communication sensitivity; and
   select a number of altitudes from the shadow start point to the shadow end point, which is less than a predetermined number of normal measurements, to control the unmanned aerial vehicle to measure the communication sensitivity for each altitude by the number of altitudes selected while the unmanned aerial vehicle flies when the time the vehicle arrives at the shadow area is earlier than the time in which the unmanned aerial vehicle completes the measurement of the communication sensitivity.

9. The system of claim 8, wherein the unmanned aerial vehicle is further configured to:
   identify a minimum altitude, a maximum altitude, and an intermediate altitude which is an intermediate height between the minimum altitude and the maximum altitude while reciprocating along a driving path of the vehicle from the shadow start point to the shadow end point; and
   measure the communication sensitivity while making a one-way flight at the minimum altitude, the intermediate altitude, or the maximum altitude along the driving path.

10. The system of claim 9, wherein the unmanned aerial vehicle is further configured to:
perform as a wireless repeater between the vehicle and the wireless communication base station while flying at the minimum altitude, the intermediate altitude or the maximum altitude based on a driving distance of the vehicle from the shadow start point to the shadow end point when the vehicle arrives in the shadow area.

11. The system of claim 6, wherein the unmanned aerial vehicle includes:
a communication device configured to perform communication between the telematics server and the vehicle;
a sensor configured to measure the communication sensitivity by communicating with a wireless communication base station around the shadow area; and
a flight controller configured to control flight of the unmanned aerial vehicle in the shadow area.

12. A method of controlling an unmanned aerial vehicle, the method including:
receiving, by a telematics server, a departure point and a destination from a vehicle;
transmitting, by the telematics server, information related to a shadow area between the departure point and the destination to the unmanned aerial vehicle to control the unmanned aerial vehicle to measure a communication sensitivity for a plurality of altitudes in the shadow area;
determining, by the telematics server, an optimal altitude path based on the communication sensitivity for each of the altitudes in the shadow area measured through the unmanned aerial vehicle; and
controlling, by the telematics server, the unmanned aerial vehicle to assist a communication function of the vehicle while the unmanned aerial vehicle flies along the optimal altitude path when the vehicle passes through the shadow area,
wherein the determining an optimal altitude path include:
selecting, by the telematics server, the plurality of altitudes in the shadow area;
measuring, by the unmanned aerial vehicle, the communication sensitivity for each altitude; and
determining, by the telematics server, a path connecting altitudes with a highest measured communication sensitivity in an arbitrary section as the optimal altitude path, and
wherein the shadow area is an area in which communication sensitivity is less than a predetermined threshold.

13. The method of claim 12, further including:
selecting, by the telematics server, an outermost point on one side of the shadow area as a shadow start point, and selecting an outermost point of an opposite side of the shadow area as a shadow end point;
controlling, by the telematics server, the unmanned aerial vehicle to measure the communication sensitivity through communication with a wireless communication base station around the shadow area while the unmanned aerial vehicle flies from the shadow start point to the shadow end point; and
determining, by the telematics server, the optimal altitude path by receiving the communication sensitivity measured through the unmanned aerial vehicle.

14. The method of claim 13, further including:
comparing, by the telematics server, a time in which the unmanned aerial vehicle completes the measurement of the communication sensitivity with a time in which the vehicle arrives in the shadow area;
selecting, by the telematics server, the plurality of altitudes from the shadow start point to the shadow end point to control the unmanned aerial vehicle to normally measure the communication sensitivity for each altitude while the unmanned aerial vehicle flies when the time the vehicle arrives at the shadow area is later than the time in which the unmanned aerial vehicle completes the measurement of the communication sensitivity; and
selecting, by the telematics server, a number of altitudes from the shadow start point to the shadow end point, which is less than a predetermined number of normal measurements, to control the unmanned aerial vehicle to measure the communication sensitivity for each altitude by the number of altitudes selected while the unmanned aerial vehicle flies when the time the vehicle arrives at the shadow area is earlier than the time the unmanned aerial vehicle completes measuring the communication sensitivity.

15. The method of claim 14, further including:
identifying, by the unmanned aerial vehicle, a minimum altitude, a maximum altitude, and an intermediate altitude which is an intermediate height between the minimum altitude and the maximum altitude while reciprocating along a driving path of the vehicle from the shadow start point to the shadow end point; and
measuring, by the unmanned aerial vehicle, the communication sensitivity while making a one-way flight at the minimum altitude, the intermediate altitude, or the maximum altitude along the driving path.

16. The method of claim 15, further including:
performing, by the unmanned aerial vehicle, as a wireless repeater between the vehicle and the wireless communication base station while flying at the minimum altitude, the intermediate altitude or the maximum altitude based on a driving distance of the vehicle from the shadow start point to the shadow end point when the vehicle arrives in the shadow area.

17. A method of controlling an unmanned aerial vehicle, the method including:
receiving, by a telematics server, information related to a shadow area based on a departure point and a destination of a vehicle from a telematics server to measure a communication sensitivity for a plurality of altitudes in the shadow area;
receiving, by the unmanned aerial vehicle, an optimal altitude path from the telematics server after transmitting the communication sensitivity for each of the altitudes in the shadow area to the telematics server; and
assisting, by the unmanned aerial vehicle, a communication function of the vehicle while flying along the optimal altitude path when the vehicle passes through the shadow area,
wherein the receiving, by the unmanned aerial vehicle, an optimal altitude path from the telematics server includes:
selecting, by the telematics server, a plurality of altitudes in the shadow area;
measuring, by the unmanned aerial vehicle, the communication sensitivity for each altitude; and
determining, by the telematics server, a path connecting altitudes with a highest measured communication sensitivity in an arbitrary section as the optimal altitude path, and wherein the shadow area is an area in which communication sensitivity is less than a predetermined threshold.

18. The method of claim 17, further including:

selecting, by the telematics server, an outermost point on one side of the shadow area as a shadow start point, and selecting an outermost point of an opposite side of the shadow area as a shadow end point;

controlling, by the telematics server, the unmanned aerial vehicle to measure the communication sensitivity through communication with a wireless communication base station around the shadow area while the unmanned aerial vehicle flies from the shadow start point to the shadow end point; and determining, by the telematics server, the optimal altitude path by receiving the communication sensitivity measured through the unmanned aerial vehicle.

19. The method of claim 18, further including:

comparing, by the telematics server, a time in which the unmanned aerial vehicle completes the measurement of the communication sensitivity with a time in which the vehicle arrives in the shadow area;

selecting, by the telematics server, the plurality of altitudes from the shadow start point to the shadow end point to control the unmanned aerial vehicle to normally measure the communication sensitivity for each altitude while the unmanned aerial vehicle flies when the time the vehicle arrives at the shadow area is later than the time in which the unmanned aerial vehicle completes the measurement of the communication sensitivity; and selecting, by the telematics server, a number of altitudes from the shadow start point to the shadow end point, which is less than a predetermined number of normal measurements, to control the unmanned aerial vehicle to measure the communication sensitivity for each altitude by the number of altitudes selected while the unmanned aerial vehicle flies when the time the vehicle arrives at the shadow area is earlier than the time the unmanned aerial vehicle completes measuring the communication sensitivity.

20. The method of claim 19, further including:

identifying, by the unmanned aerial vehicle, a minimum altitude, a maximum altitude, and an intermediate altitude which is an intermediate height between the minimum altitude and the maximum altitude while reciprocating along a driving path of the vehicle from the shadow start point to the shadow end point; and measuring, by the unmanned aerial vehicle, the communication sensitivity while making a one-way flight at the minimum altitude, the intermediate altitude, or the maximum altitude along the driving path.

21. The method of claim 20, further including:

performing, by the unmanned aerial vehicle, as a wireless repeater between the vehicle and the wireless communication base station while flying at the minimum altitude, the intermediate altitude or the maximum altitude based on a driving distance of the vehicle from the shadow start point to the shadow end point when the vehicle arrives in the shadow area.

* * * * *